US008509542B2

(12) United States Patent
Ludwig

(10) Patent No.: US 8,509,542 B2
(45) Date of Patent: *Aug. 13, 2013

(54) HIGH-PERFORMANCE CLOSED-FORM SINGLE-SCAN CALCULATION OF OBLONG-SHAPE ROTATION ANGLES FROM BINARY IMAGES OF ARBITRARY SIZE AND LOCATION USING RUNNING SUMS

(76) Inventor: Lester F. Ludwig, Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,842

(22) Filed: Apr. 7, 2012

(65) Prior Publication Data

US 2012/0195522 A1    Aug. 2, 2012

Related U.S. Application Data

(63) Continuation of application No. 12/724,413, filed on Mar. 15, 2010, now Pat. No. 8,170,346.

(60) Provisional application No. 61/210,250, filed on Mar. 14, 2009.

(51) Int. Cl.
*G06K 9/46* (2006.01)

(52) U.S. Cl.
USPC ........... 382/203; 382/162; 382/167; 382/165; 382/169; 382/170; 382/220; 382/218

(58) Field of Classification Search
CPC ... G06K 9/00134; G06K 9/468; G06K 9/525; G06K 9/6204; G06K 9/6209; G06T 7/004
USPC ................ 382/203, 162, 167, 165, 170, 169, 382/220, 218
See application file for complete search history.

(56) References Cited

U.S. PATENT DOCUMENTS

| 1,947,020 A | 2/1934 | Ranger |
| 3,493,669 A | 2/1970 | Elbrecht et al. |

(Continued)

FOREIGN PATENT DOCUMENTS

EP    0 574 213 A1    12/1993

OTHER PUBLICATIONS

Moog, Robert A. 'The Human Finger—A Versatile Electronic Music Instrument Component, Audio Engineering Society Preprint, 1977, New York, NY, USA.

(Continued)

*Primary Examiner* — Mike Rahmjoo
(74) *Attorney, Agent, or Firm* — Procopio, Cory, Hargreaves & Savitch LLP

(57) ABSTRACT

A method and system for calculating oblong-shape rotation angles from binary images of arbitrary size using running sums is described without the need of eigenvector routines and storage of the image data. The oblong shape may be of arbitrary size and location and need not be precisely elliptical. A few running sums are calculated and stored throughout each scan, and the results are obtained in closed form by simple post-scan computation. An algorithmic embodiment can execute on one or more hardware processors with limited or otherwise constrained computation power, available instruction cycles, available memory, etc. Hardware processors may CPUs found in desktops, laptops, tablets, or handheld computing devices. The resulting arrangement may be used for touch or optical user interfaces, real-time image recognition, real-time machine vision, and other purposes.

20 Claims, 7 Drawing Sheets

(56) References Cited

U.S. PATENT DOCUMENTS

| | | |
|---|---|---|
| 3,591,699 A | 7/1971 | Cutler |
| 3,612,741 A | 10/1971 | Marshall |
| 3,651,242 A | 3/1972 | Evans |
| 3,730,046 A | 5/1973 | Spence |
| 3,742,133 A | 6/1973 | O'Sullivan |
| 3,805,091 A | 4/1974 | Colin |
| 3,813,473 A | 5/1974 | Terymenko |
| 3,878,748 A | 4/1975 | Spence |
| 3,956,959 A | 5/1976 | Ebihara et al. |
| 3,962,945 A | 6/1976 | Creager et al. |
| 4,075,921 A | 2/1978 | Heet |
| 4,080,867 A | 3/1978 | Ratanangsu |
| 4,117,413 A | 9/1978 | Moog |
| 4,122,742 A | 10/1978 | Deutsch |
| 4,151,368 A | 4/1979 | Fricke et al. |
| 4,182,213 A | 1/1980 | Iodice |
| 4,274,321 A | 6/1981 | Swartz |
| 4,318,327 A | 3/1982 | Toups |
| 4,365,533 A | 12/1982 | Clark, Jr. et al. |
| 4,748,676 A * | 5/1988 | Miyagawa et al. .......... 382/288 |
| 4,781,099 A | 11/1988 | Koike |
| 4,794,838 A | 1/1989 | Corrigau, III |
| 4,797,608 A | 1/1989 | White |
| 4,852,444 A | 8/1989 | Hoover et al. |
| 4,899,137 A | 2/1990 | Behrens et al. |
| 4,991,488 A | 2/1991 | Fala et al. |
| 5,033,352 A | 7/1991 | Kellogg et al. |
| 5,045,687 A | 9/1991 | Gurner |
| 5,070,399 A | 12/1991 | Martel |
| 5,146,833 A | 9/1992 | Lui |
| 5,159,140 A | 10/1992 | Kimpara et al. |
| 5,218,160 A | 6/1993 | Grob-De Veiga |
| 5,233,123 A | 8/1993 | Rose et al. |
| 5,237,647 A | 8/1993 | Roberts et al. |
| 5,262,585 A | 11/1993 | Greene et al. |
| 5,270,711 A | 12/1993 | Knapp |
| 5,281,754 A | 1/1994 | Farrett et al. |
| 5,292,999 A | 3/1994 | Tumura |
| 5,341,133 A | 8/1994 | Savoy et al. |
| 5,357,048 A | 10/1994 | Sgroi |
| 5,378,850 A | 1/1995 | Tumura |
| 5,386,219 A | 1/1995 | Greanias et al. |
| 5,420,936 A | 5/1995 | Fitzpatrick et al. |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |
| 5,565,641 A | 10/1996 | Gruenbaum |
| 5,585,588 A | 12/1996 | Tumura |
| 5,592,572 A * | 1/1997 | Le .................... 382/289 |
| 5,592,752 A * | 1/1997 | Fu et al. ............... 34/388 |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,719,347 A | 2/1998 | Masubachi et al. |
| 5,719,561 A | 2/1998 | Gonzales |
| 5,741,993 A | 4/1998 | Kushimiya |
| 5,748,184 A | 5/1998 | Shieh |
| 5,763,806 A | 6/1998 | Willis |
| 5,786,540 A | 7/1998 | Westlund |
| 5,801,340 A | 9/1998 | Peter |
| 5,805,137 A | 9/1998 | Yasutake |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A | 12/1999 | Nishida et al. |
| 6,037,937 A | 3/2000 | Beaton et al. |
| 6,047,073 A | 4/2000 | Norris et al. |
| 6,051,769 A | 4/2000 | Brown, Jr. |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari et al. |
| 6,392,705 B1 | 5/2002 | Chaddha |
| 6,400,836 B2 | 6/2002 | Senior |
| 6,404,898 B1 | 6/2002 | Rhoads |
| 6,408,087 B1 | 6/2002 | Kramer |
| 6,570,078 B2 * | 5/2003 | Ludwig ..................... 84/600 |
| 6,703,552 B2 | 3/2004 | Haken |
| 6,793,619 B1 | 9/2004 | Blumental |
| 7,030,860 B1 | 4/2006 | Hsu et al. |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0036299 A1 | 11/2001 | Senior |
| 2002/0005108 A1 | 1/2002 | Ludwig |
| 2002/0093491 A1 | 7/2002 | Gillespie et al. |
| 2004/0074379 A1 | 4/2004 | Ludwig |
| 2004/0251402 A1 | 12/2004 | Reime |
| 2006/0252530 A1 | 11/2006 | Oberberger et al. |
| 2007/0044019 A1 | 2/2007 | Moon |
| 2007/0063990 A1 | 3/2007 | Park |
| 2007/0229477 A1 | 10/2007 | Ludwig |
| 2008/0010616 A1 | 1/2008 | Algreatly |
| 2008/0143690 A1 | 6/2008 | Jang |
| 2008/0164076 A1 | 7/2008 | Orsley |
| 2008/0259053 A1 | 10/2008 | Newton |
| 2008/0300055 A1 * | 12/2008 | Lutnick et al. .................. 463/39 |
| 2008/0309634 A1 | 12/2008 | Hotelling et al. |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1 | 10/2009 | Ludwig et al. |
| 2010/0013860 A1 | 1/2010 | Mandella |
| 2010/0044121 A1 | 2/2010 | Graham et al. |
| 2010/0079385 A1 | 4/2010 | Holmgren |
| 2010/0087241 A1 | 4/2010 | Nguyen et al. |
| 2010/0090963 A1 | 4/2010 | Dubs |
| 2010/0110025 A1 | 5/2010 | Lim |
| 2010/0117978 A1 | 5/2010 | Shirado |
| 2010/0177118 A1 | 7/2010 | Sytnikov |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 | 12/2010 | Wilairat |
| 2010/0328032 A1 | 12/2010 | Rofougaran |
| 2011/0007000 A1 | 1/2011 | Lim |
| 2011/0037735 A1 | 2/2011 | Land |
| 2011/0063251 A1 | 3/2011 | Geaghan |
| 2011/0086706 A1 | 4/2011 | Zalewski |
| 2011/0202889 A1 | 8/2011 | Ludwig |
| 2011/0202934 A1 | 8/2011 | Ludwig |
| 2011/0210943 A1 | 9/2011 | Zaliva |
| 2011/0260998 A1 | 10/2011 | Ludwig |
| 2011/0261049 A1 | 10/2011 | Cardno |

| | | |
|---|---|---|
| 2011/0285648 A1 | 11/2011 | Simon et al. |
| 2012/0007821 A1 | 1/2012 | Zaliva |
| 2012/0034978 A1 | 2/2012 | Lim |
| 2012/0056846 A1 | 3/2012 | Zaliva |
| 2012/0108323 A1 | 5/2012 | Kelly et al. |
| 2012/0192119 A1 | 7/2012 | Zaliva |
| 2012/0194462 A1 | 8/2012 | Lim |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |
| 2012/0280928 A1 | 11/2012 | Ludwig |
| 2012/0317521 A1 | 12/2012 | Ludwig |
| 2013/0009896 A1 | 1/2013 | Zaliva |
| 2013/0038554 A1 | 2/2013 | West |

OTHER PUBLICATIONS

Johnson, Colin "Image sensor tracks moving objects in hardware", Electronic Engineering Times, Apr. 5, 1999.
Kaoss pad dynamic effect/controller, Korg Proview Users' magazine Summer 1999.
Leiberman, David 'Touch screens extend grasp Into consumer realm Electronic Engineering Times, Feb. 8, 1999.
"Lim, Agrawal, and Nekludova""A Fast Algorithm for Labelling Connected Components in Image Arrays"", Technical Report Series, No. NA86-2, Thinking Machines Corp., 1986 (rev. 1987),Cambridge, Mass., USA."
Pennywitt, Kirk "Robotic Tactile Sensing," Byte, Jan. 1986.
Review of KORG X-230 Drum (later called 'Wave Drum), Electronic Musician, Apr. 1994.
Rich, Robert "Buchla Lightning MIDI Controller", Electronic Musician, Oct. 1991.
Rich, Robert "Buchla Thunder", Electronic Musician, Aug. 1990.
Dario P. and Derossi D. "Tactile sensors and the gripping challenge," IEEE Spectrum, vol. 5, No. 22, pp. 46-52, Aug. 1985.
Snell, John M. "Sensors for Playing Computer Music with Expression", Proceedings of the Intl. Computer Music Conf. at Eastman, 1983.
Verner J. Artif Starr Switch Company Ztar 624-D, Electronic Musician, Nov. 1994.
Lippold Haken, "An Indiscrete Music Keyboard," Computer Music Journal, Spring 1998, pp. 30-48.
Moyle, Michael, et al. "A Flick in the Right Direction: A Case Study of Gestural Input." Conferences in Research and Practice in Information Technology, vol. 18, Jan. 2005; New Zealand.
Dulberg, Martin S., et al. "An Imprecise Mouse Gesture for the Fast Activation of Controls." IOS Press, Aug. 1999.
USPTO Notice of Allowance dated Mar. 20, 2012 issued in U.S. Appl. No. 12/724,413, filed Mar. 15, 2010.
USPTO Notice of Allowance dated Jan. 10, 2008 issued in U.S. Appl. No. 10/683,914, filed Oct. 10, 2003.
USPTO Notice of Allowance dated Nov. 9, 2012 issued in U.S. Appl. No. 12/502,230, filed Jul. 13, 2009.
USPTO Notice of Allowance dated Mar. 12, 2012 issued in U.S. Appl. No. 12/511,930, filed Jul. 29, 2009.
USPTO Notice of Allowance dated Feb. 19, 2013 issued in U.S. Appl. No. 13/442,806, filed Apr. 9, 2012.
USPTO Notice of Allowance dated Feb. 22, 2013 issued in U.S. Appl. No. 13/442,815, filed Apr. 9, 2012.
USPTO Notice of Allowance dated Dec. 24, 2002 issued in U.S. Appl. No. 09/812,870, filed Mar. 19, 2001.
Hernandez-Leon, R., "Classifying using Specific Rules with High Confidence" IEEE Nov. 2010.
Fang, Yuguang, et al, "Dynamics of a Winner-Take-All Neural Network" Neural Networks vol. 9, No. 7, pp. 1141-1154, Oct. 1996.

\* cited by examiner

HIGH-PERFORMANCE CLOSED-FORM SINGLE-SCAN CALCULATION OF OBLONG-SHAPE ROTATION ANGLES FROM BINARY IMAGES OF ARBITRARY SIZE AND LOCATION USING RUNNING SUMS

CROSS-REFERENCE TO RELATED APPLICATIONS

This application is a continuation of U.S. application Ser. No. 12/724,413, filed on Mar. 15, 2010, which claims benefit of priority from U.S. Provisional Application 61/210,250, filed Mar. 14, 2009, the contents of which are incorporated herein.

FIELD OF THE INVENTION

This invention relates to a method for determining the yaw angle of an oblong shape binary image, and in particular a method for determining the yaw angle using only a single pass of the binary data contained in the image.

DESCRIPTION OF THE RELATED ART

A binary image provided by a proximity sensing system, pressure sensing system, optical sensing system, image processing system, simulation program, etc. may comprise one or more contiguous shapes, these shapes comprising pixels assigned one binary value that are surrounded by a region comprising pixels assigned the opposite binary value.

In some situations, one or more of these contiguous shapes may be oblong in geometric form. This oblong shape may further be oriented in an angular position with respect to coordinate axes of the binary image (for example rows and columns) as suggested in FIGS. 1a-1c. An example of such a shape is that of a finger in contact with a proximity, pressure, optical, or other form of user interface touchpad, touch screen, or touch surface. An exemplary arrangement is suggested in FIG. 2. Here the orientation angle, taken with respect to the rows and columns of the image data produced by the touchpad sensor system, corresponds to the rotational yaw angle of the finger with respect to the vertical, horizontal, or other axes-system associated with or imposed on the touchpad sensor system. Such an arrangement is taught, for example, in U.S. Pat. No. 6,570,078.

In an exemplary arrangement pertaining to these and other types of proximity, pressure, optical imaging systems, a sensor array is interfaced to a data acquisition element. In some embodiments pertaining to these and other types of proximity, pressure, optical imaging systems, the data acquisition element may direct addressing, synchronization, stimulus, and/or other types of control signals to the sensor. In other embodiments, the sensor array may provide a stream of data, a data frame similar to an image, or other forms of proximity, pressure, and/or optical image measurement data to the data acquisition element. The data acquisition element provides measurement data to an algorithm executing on a hardware computer processor element. In an exemplary arrangement pertaining to these and other types of proximity, pressure, optical imaging systems, the data acquisition element may comprise an additional algorithm running on the same hardware computer processor element, or another hardware computer processor element. The hardware computer processor element(s) may comprise a CPU as found in a desktop, laptop, tablet, or handheld computing device, and embedded processor, a signal processor chip, etc. FIG. 3 provides an exemplary high-level representation of these concepts. In an embodiment, the production of binary image may include operations such as filtering or statistics-based processing to suppress noise in the measurements, non-operating sensor elements, missing data elements, etc.

The angular orientation, or rotation, with respect to a fixed reference orientation may be calculated in a number of ways. For example, a least squares method may be used to fit a line through the image data, and the slope of the fitted line may be converted to an angle by an inverse tangent or inverse cotangent function. Such an arrangement is taught, for example, in U.S. Pat. No. 6,570,078. Such a system can be advantageous because the least-squares calculation can be organized into a small collection of running sums that can be updated during scanning of the sensor. At the end of a scan, this small collection of running sums is presented to a simple post-scan calculation to determine the best-fit line slope, which as described above is presented to an inverse tangent or inverse cotangent function to recover the angular orientation or rotation. It is noted that the least-squares line fit relies on summing the square distance of deviation from an unknown parameterized line, and the line parameters are then algebraically calculated so as to minimize the sum of the square distance deviations. FIG. 4 depicts an exemplary high-level representation of this type of arrangement.

Another way to calculate angular orientation or rotation with respect to a fixed reference orientation is though use of an eigenvector approach applied to a 2×2 covariance matrix, planar moment of inertia (matrix) tensor, or other 2×2 quadratic-form matrix. The covariance matrix, planar moment of inertia (matrix) tensor, and their associated (quadratic form) variants rely on summing the square distance of deviation from a associated centroid (row center and column center).

The eigenvectors of the covariance matrix, planar moment of inertia (matrix) tensor, and other quadratic-form matrices of the like can be interpreted as rotation angles and related to columns of a 2×2 rotation matrix. Such an approach may be found in the pending U.S. patent application Ser. No. 12/541,948 and elsewhere, for example in U.S. Pat. No. 4,748,676. The angle of a selected eigenvector can be calculated by taking the ratio of the two components of the eigenvector and presenting this ratio to an inverse tangent or inverse cotangent.

There are at least two areas of practical difficulties with the latter approach that are addressed by the present invention. First, finding eigenvectors typically involves a complicated algorithm. The present invention overcomes this by providing a closed-form solution for the components of a selected eigenvector sufficient to determine the angle of rotation. Second, if the calculations are made directly from the definitions, two passes through the data are required: a first pass must be made through the full set of image data in order to first determine the centroid (row center and column center), then a second pass must be made through the full set of image data in order to calculate the square of the distance of separation of a given pixel from the centroid. FIG. 5 shows an exemplary arrangement calling out these practical concerns.

The above attributes of the latter approach has several disadvantages. For example in large images, the data must be stored or a long new scan must be started. Regardless of the image size, should the image data not be stored, a rapid change in the image data from scan to scan can corrupt a calculation that uses the centroid calculated from a previous scan to find the squared separation distance from the centroid calculated in a current scan. The present invention overcomes these and other related problems by decomposing the squared separation distance calculations in such a way that the centroid is not needed until a post-scan calculation, and the decomposition involves running sums that may be calculated during the same scan used to create the running sums for the row and column centers. In many applications, for example those required to be responsive in user-perceived real-time (such as in user interface applications, real-time image recognition, or real-time machine vision) and/or executing on one or more hardware processors with limited or otherwise constrained computation power, available instruction cycles, available memory, etc., these disadvantages can be significant and preclude practical use of the latter approach. Thus, a more efficient and realistic implementation of yaw angle calculation is desirable.

BRIEF DESCRIPTION OF THE DRAWINGS

The above and other aspects, features and advantages of the present invention will become more apparent upon consideration of the following description of preferred embodiments taken in conjunction with the accompanying drawing figures, wherein.

DETAILED DESCRIPTION

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Figure 1A:
FIGS. 1a-1c depict exemplary oblong contiguous shapes comprised within a binary image, wherein the shapes may be oriented in an angular position with respect to coordinate axes of the binary image.
Figure 1B:
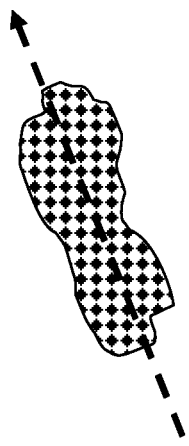
Figure 1C:
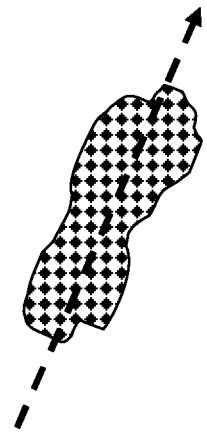
Figure 2:
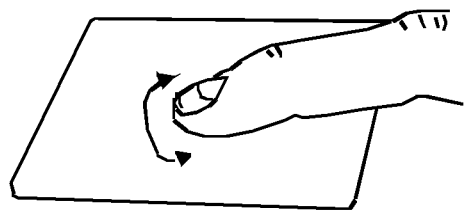
FIG. 2 depicts an exemplary arrangement wherein a finger in contact with a proximity, pressure, optical, or other form of user interface touchpad, touch screen, or touch surface'
Figure 3:
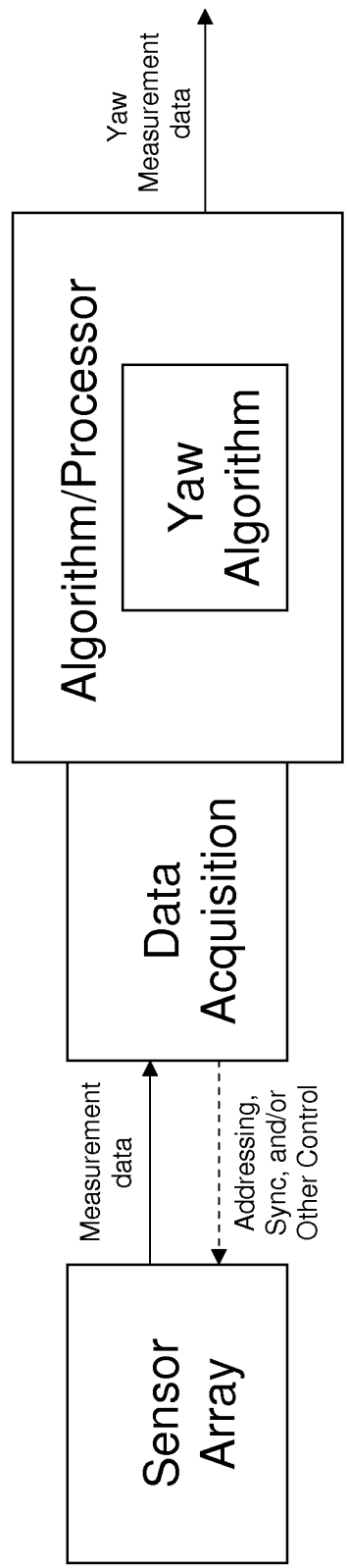
FIG. 3 provides an exemplary high-level representation of exemplary systems relevant to the present invention.
Figure 4:
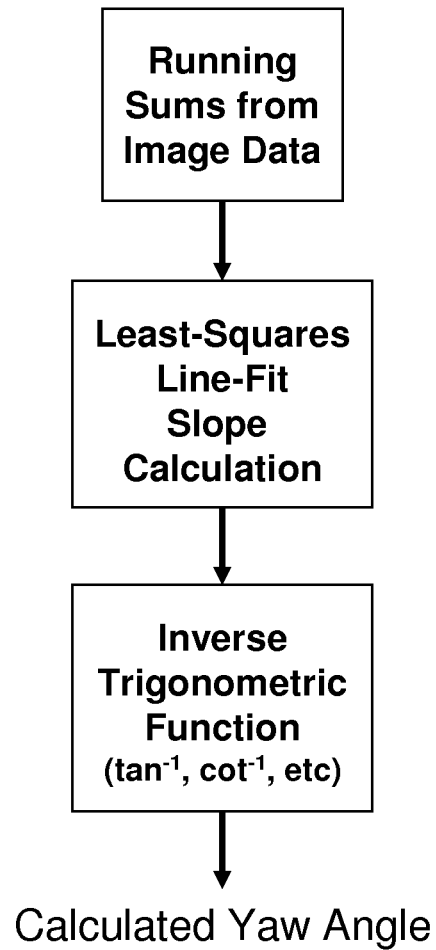
FIG. 4 depicts an exemplary high-level representation of an exemplary approach for computing an implied yaw angle employing a least-squares line fit and an inverse trigonometric function.
Figure 5:
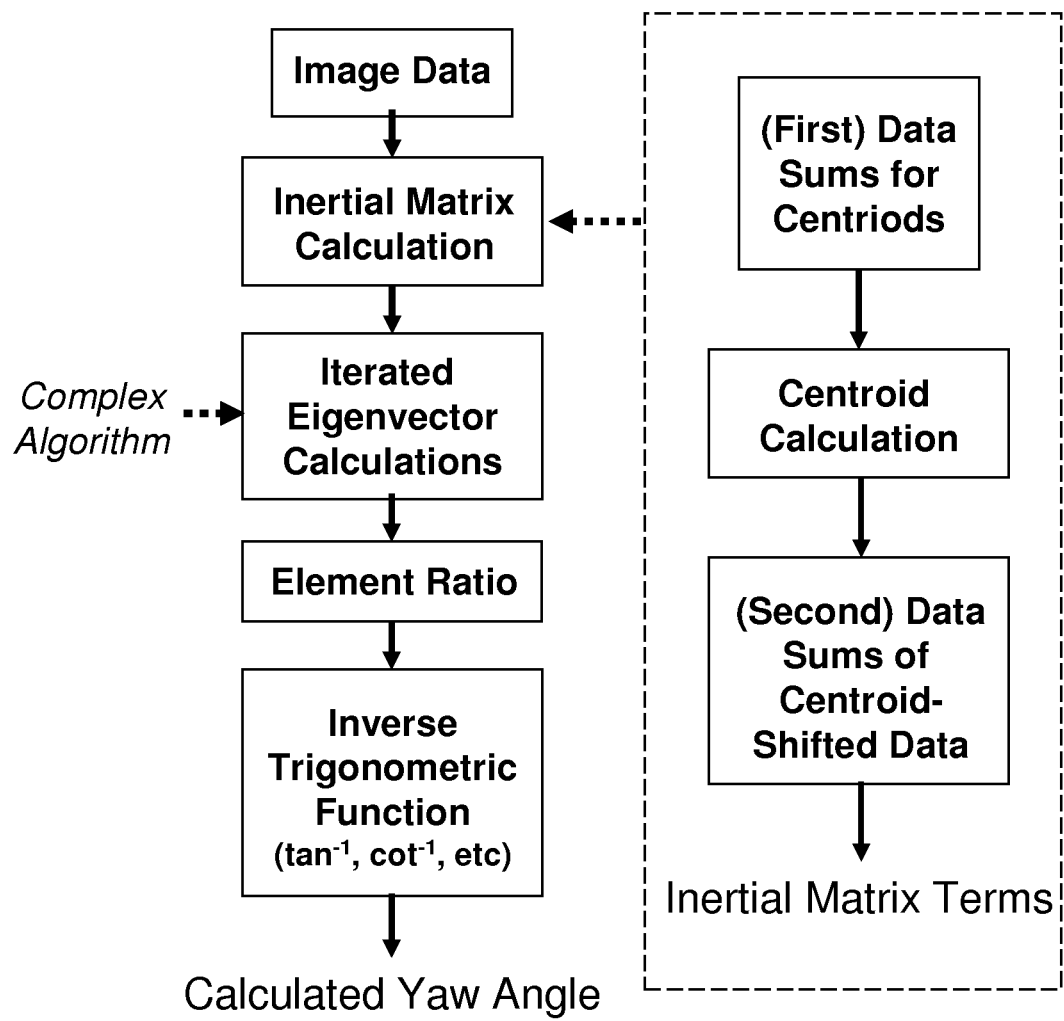
FIG. 5 depicts an exemplary high-level representation of an exemplary approach for computing an implied yaw angle employing an eigenvector of an inertial matrix and an inverse trigonometric function, further calling out problematic implementation concerns and limitations.
Figure 6:
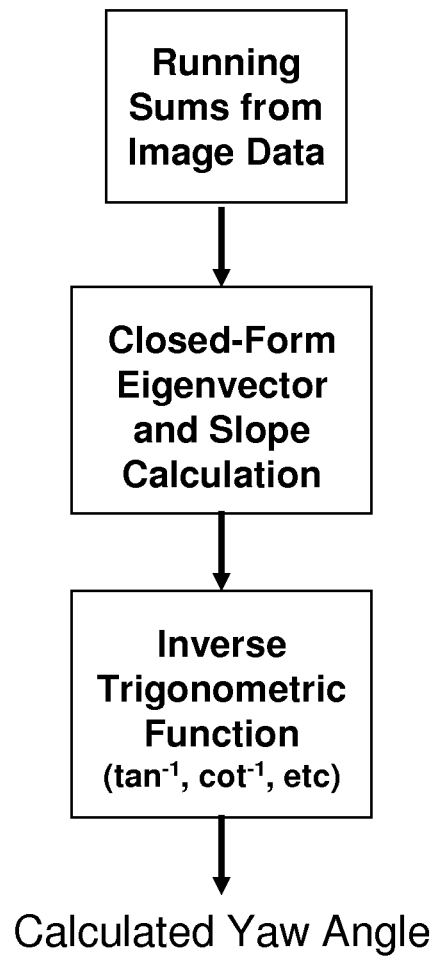
FIG. 6 depicts an exemplary representation of the invention comparable to the exemplary arrangement of FIG. 4.

Thus the present invention provides a scalable high-performance closed-form single-scan calculation of oblong-shape rotation angles from binary images of arbitrary size using running sums. No eigenvector routines are used, and no storage of the image data is required. Only a few running sums are calculated and stored throughout each scan, and the results are obtained in closed form by simple post-scan computation. The resulting arrangement may be implemented in a form such as that depicted in FIG. 6, directly comparable to the exemplary arrangement of FIG. 4 and its aforementioned advantages. This approach additionally can be used or adapted to provide other derived parametric data as well, for example measures of the oblongness of the oblong-shape via closed-form calculations of the eigenvalues. The resulting system and/or method may be used for touch or optical user interfaces, real-time image recognition, real-time machine vision, and other purposes.

In six-degree-of-freedom rigid motion, the three different degrees of angles for roll, pitch, and yaw are commonly denoted by the symbols $\phi$, $\theta$, and $\psi$. As an envisioned application is recovery of the yaw angle of a finger contact image with a touchpad system, the rotation angle to be calculated by the invention will be denoted $\psi$.

In the field of analytical mechanics the moment of inertia tensor or matrix is at times regarded as defining the orientation of a solid object in free-space or the plane. The following 2×2 covariance, planar moment of inertia, or other quadratic-form matrix is assumed for the algorithm for calculating the moment of inertia to calculate the rotation angle $\psi$.

$$\begin{bmatrix} RR & RC \\ CR & CC \end{bmatrix} \quad (1)$$

Here "R" denotes "row" and "C" denotes "column," said rows and columns as may be used to organize the scan of an array sensor or an image data set provided by other means or systems. There are several definitions for these terms that involve inclusions or neglect of normalizations and the use minus signs on the off-diagonal terms. These varying definitions end of not affecting the calculations presented herein appreciably, so the simplest definition (no normalization, no off-diagonal negative signs) is provided and commentary offered later as to implications of the various definitions. As will be seen, this simplest definition also offers performance advantages in computation, particularly in real-time systems.

The entries of the matrix as defined above (RR, RC, CR, and CC) are cumulative sums obtained by the following:

$$RR = \Sigma\Sigma(ri-r_0)^2 * th(ri,ci) \quad (2)$$

$$RC = \Sigma\Sigma(ri-r_0)(ci-c_0) * th(ri,ci) \quad (3)$$

$$CR = \Sigma\Sigma(ci-c_0)(ri-r_0) * th(ri,ci) \quad (4)$$

$$CC = \Sigma\Sigma(ci-c_0)^2 * th(ri,ci) \quad (5)$$

The double sums may be calculated over all row and column index combinations in any order. The variable $r_0$ denotes the mean row-coordinate of the non-zero pixels (i.e., the geometric row center), and the variable $c_0$ denotes the mean column-coordinate of the non-zero pixels (i.e., the geometric column center). The function th(ri,ci) is a binary-valued $\{0,1\}$ function that represents whether a measurement or data value, p(ri,ci) is greater than a specified threshold t. The value of t can be adjusted to suppress the computational impacts of low-level noise in the sensor measurements or other data.

$$th(ri,ci) = \text{if } (p(ri,ci) \geq t) \quad (6)$$

For example, an exemplary embodiment would thus during a scan assign measurement or data values exceeding t with the value of 1, and otherwise assign a value of 0. Pixel measurements or data whose value of th(ri,ci) is 1 will be referred to as "active pixels" while other pixels will be referred to as "non-active pixels." Multiplying by th(ri,ci) thus excludes terms associated with non-active pixels in the computation of obtaining aggregated sums because for these the value of th(ri,ci) is zero.

The quantity RR contains the value of the sum of the square of the vertical distance from the geometric center, and the quantity CC contains the value of the sum of the square of the horizontal distance from the geometric column center.

The quantities RC and CR are equivalent and thus interchangeable in subsequent calculation. Each is a cumulative sum of the product of the vertical and horizontal distance from the geometric center.

Note the definition of each of RR, RC, CR, and CC depend on the value of $r_0$ and $c_0$. Thus a direct calculation using the literal definition of RR, RC, CR, and CC would appear to require the values of $r_0$ and $c_0$ to be first calculated in advance. As mentioned earlier, this could require an entire second pass through the image data, but as shown later these may be calculated in the same scan of the data as that for of $r_0$ and $c_0$ by an innovation of the present invention Obtaining Geometric Row and Column Center In many embodiments, measurements from each sensor within an array of sensors (or other data) are acquired and values are examined in a specified order. For example, each sensor pixel measurement (or other data) may be selected according to nested increasing row and column indices. In other embodiments, such as those described in U.S. application Ser. No. 12/418,605, a distributed scan may be used and corresponding separate running sums may be combined in a post-scan calculation.

For simplicity, it can be assumed there is a sequential scan of the entire array of sensor array measurements or other image data, and that there is only a single contiguous shape (or region) of active pixels. More complex situations, such as those where there are multiple contiguous regions of active pixels present, can be readily handled by identifying each contiguous region of active pixels and computing a separate isolated set of running sums (to be described) for each such region. Such approaches are discussed in U.S. application Ser. No. 12/418,605.

An exemplary embodiment is now presented for the aforementioned assumed situation of only a single contiguous region of active pixels. As each active pixel is encountered, a counter variable tval gets incremented by 1. The value of tval will represent the (pixel-count metric of) "area" of the contiguous region of active pixels. At the completion of a scan, the value of the geometric row center may be readily obtained by dividing cumulative sum of row indices of active pixels by the number of active pixels. Similarly, the value of the geometric column center can then be readily obtained by dividing cumulative sum of column indices of active pixels by the number of active pixels.

For example, let the cumulative sum of row and column indices be represented by the following variables:

rsum=the cumulative sum of the row indices of active pixels csum=the cumulative sum of the column indices of active pixels An exemplary implementation may be structured as:

```
for(ri=1; ri<=rows; ri++) {            // scan each row
    for(ci=1; ci<=cols; ci++) {        // scan each column
        if(p(ri,ci)>=t) {              // if the value of pixel exceeds the
                                       //   threshold
            tval++;                    // increment tval by 1
            rsum += ri;                // increment rsum by ri
            csum+=ci;                  // increment csum by ci
        };
    };
};
```

Note that in this exemplary programming language implementation, statements for cumulative rsum and csum executed when the if statement is satisfied, ri and ci do not need to be multiplied by the value of th(ri,ci) because when the if statement is satisfied, the value of th(ri, ci) is effectively 1 and when the if statement is not satisfied the sum statements are skipped over (thus equivalent to a value of 0 for th(ri,ci)).

At the end of the data array scan the geometric centers of row and column, $r_0$ and $c_0$, may be readily calculated in a post-scan calculation using the values of cumulative sum variables above:

$$r_0 = \frac{rsum}{tval} \quad (7)$$

$$c_0 = \frac{csum}{tval} \quad (8)$$

The values of these variables may be stored for subsequent calculations and/or system output. For example, the values of $r_0$ and $c_0$ may be output directly as the geometric center of a finger's contact with a touchpad sensor array. The values of tval, rsum and csum may also be stored for subsequent calculations.

In some embodiments one or more of the values of tval, rsum and csum may be used as system output.

Obtaining Entries of the Covariance Matrix

If the definition of RR, RC, and CC is used directly for the calculation, the values of the row geometric center $r_0$ and the column geometric center $c_0$ obtained above must be used for another scan or pass through the data array. This is because, in the definitions, these expressions depend on the values of geometric centers of rows and columns, $r_0$ and $c_0$.

Given the values of geometric centers of rows and columns $r_0$ and $c_0$, the values of RR, RC, and CC may be directly calculated from their previously provided definitions $$RR = \Sigma\Sigma(ri-r_0)^2 * th(ri,ci) \quad (9)$$

$$RC = CR = \Sigma\Sigma(ri-r_0)(ci-c_0) * th(ri,ci) \quad (10)$$

$$CC = \Sigma\Sigma(ci-c_0)^2 * th(ri,ci) \quad (11)$$

as follows:

```
for(ri=1; ri<=rows; ri++) {            // scan each row
    for(ci=1; ci<=cols; ci++) {        // scan each column
        if(p(ri,ci)>t) {               // if the value of pixel exceeds the
                                       //   threshold
            tval++;                    // increment tval by 1
            RR+=((ri-r0)^2);           // increment RR by (ri-r0)^2
            RC+=(ri-r0)*(ci-c0);       // increment RC by (ri-r0)*(ci-c0)
            CR+=(ci-c0)*(ri-r0);       // increment CR by (ci-c0)*(ri-r0)
            CC+=((ci-c0)^2);           // increment CC by (ci-c0)^2
        };
    };
};
```

However, a procedure such as this must be done in a second pass through the image data because the values of geometric centers of rows and columns $r_0$ and $c_0$ must be known in advance. As mentioned earlier, the present invention provides for expanding the quadratic terms and reorganizing the sums above so that the row geometric center and column geometric center are not needed until a post-scan calculation, and the decomposition involves a small collection of running sums that may be computed along side those needed to calculate the row geometric center and column geometric center. This is described below.

Consolidation into a Single Scan of Binary Data Array

As mentioned above, the need for a second scan or pass through the data array can be eliminated by expanding the quadratic terms involved in the definitions of RR, RC, and CC. More specifically equations for RR, RC, CR, and CC from above $$RR = \Sigma\Sigma(ri-r_0)^2 * th(ri,ci) \quad (12)$$

$$RC = CR = \Sigma\Sigma(ri-r_0)(ci-c_0) * th(ri,ci) \quad (13)$$

$$CC = \Sigma\Sigma(ci-c_0)^2 * th(ri,ci) \quad (14)$$

can be expanded as follows:

$$RR = (\Sigma\Sigma ri^2 * th(ri,ci)) - (2*r_0*\Sigma\Sigma ri * th(ri,ci)) + (r_0^2 * \Sigma th(ri,ci)) \quad (15)$$

$$RC = CR = (\Sigma\Sigma ri * ci * th(ri,ci)) - (c_0 * \Sigma\Sigma ri * th(ri,ci)) - (r_0 * \Sigma\Sigma ci * th(ri,ci)) + (r_0 * c_0 * \Sigma th(ri,ci)) \quad (16)$$

$$CC = (\Sigma ci^2 * th(ri,ci)) - (2*c_0 * \Sigma ci * th(ri,ci)) + (c_0^2 * \Sigma th(ri,ci)) \quad (17)$$

In the above equations, some of the terms that depend on the value of $r_0$ and $c_0$ can be replaced with other terms, and $r_0$ and $c_0$ are no longer needed. Specifically:

$\Sigma th(ri,ci)$ is equivalent to tval
$\Sigma(ri*th(ri,ci))$ is equivalent to $r_0$*tval
$\Sigma(ci*th(ri,ci))$ is equivalent to $c_0$*tval $r_0$ is equivalent to $\frac{rval}{tval}$.

$c_0$ is equivalent to $\frac{cval}{tval}$.

In an exemplary programmimg language embodiment, three new running sum variables, rrval, ccval, and rcval, may be introduced.

rrval=cumulative sum of the square of row indices of active pixels;
ccval=cumulative sum of the square of column indices of active pixels;
rcval=cumulative sum of the product of row and column indices of active pixels.

These running sums can be included in the first scan loop where the cumulative sum of the row indices (earlier called rsum, but renamed rval as used and clearly seen in the exemplary algorithm below) and column indices (earlier csum, but renamed cval as used and clearly seen in the exemplary algorithm below) are calculated. The result requires six running variables used in the scan:

tval
rval
cval
rrval
ccval
rcval

The covariance matrix can then be calculated in a post-scan calculation. Note the variables, $r_0$ and $c_0$, are replaced with $\frac{rval}{tval}$ and $\frac{cval}{tval}$ in the expansions.

$$RR = \left(\sum\sum ri^2 * th(ri,ci)\right) - \left(2 * \frac{rval}{tval} \sum\sum ri * th(ri,ci)\right) + \left[\frac{rval}{tval}\right]^2 * tval \quad (18)$$

$$RC = CR = \left(\sum\sum ri * ci * th(ri,ci)\right) - \left(\frac{cval}{tval} \sum\sum ri * th(ri,ci)\right) - \left(\frac{rval}{tval} \sum\sum ci * th(ri,ci)\right) + \left(\frac{rval}{tval} * \frac{cval}{tval}\right) * tval \quad (19)$$

$$CC = \left(\sum\sum ci^2 * th(ri,ci)\right) - \left(2 * \frac{cval}{tval} \sum\sum ci * th(ri,ci)\right) + \left[\frac{cval}{tval}\right]^2 * tval \quad (20)$$

An exemplary programming language embodiment can then be implemented as follows, again as before replacing the th(ri,ci) function in the above equations with a common conditional-execution "if" statement. Additionally, a post-scan computation is appended after the scan.

```
for(ri=1; ri<=rows; ri++) {          // scan each row
    for(ci=1; ci<=cols; ci++) {      // scan each column
        if(p(ri,ci)>=t) {            // if the value of pixel exceeds the
                                     //     threshold
            tval++;                  // increment tval by 1
            rrval+=ri*ri;            // increment rrval by ri^2
            rval+=ri;                // increment rval by ri
            ccval+=ci*ci;            // increment ccval by ci^2
            cval+=ci;                // increment cval by ci
            rcval+=ri*ci;            // increment rcval by ri*ci
        };
    };                               // end the scanning loop
    RR=rrval - 2*(rval/tval)*rval+(rval/tval)^2*tval;
    RC=(rcvalal/tval)*rval+(rval/tval)*cval +(rval/tval)*
    (cval/tval)*tval;
    CC=ccva l- 2*(cval/tval)*cval+(cval/tval)^2*tval;
```

Additionally, the above equations and programming language embodiments can be further simplified in a number of ways. For example:

$$\left[\frac{rval}{tval}\right]^2 * tval = \left[\frac{rval^2}{tval}\right] \quad (21)$$

$$\left[\frac{cval}{tval}\right]^2 * tval = \left[\frac{cval^2}{tval}\right] \quad (22)$$

$$\left(\frac{rval}{tval} * \frac{cval}{tval}\right) * tval = \left(\frac{rval * cval}{tval}\right) \quad (23)$$

and $$\sum (ri * th(ri,ci)) = r_0 * tval = \frac{rval}{tval} * tval = rval \quad (24)$$

$$\sum (ci * th(ri,ci)) = c_0 * tval = \frac{cval}{tval} * tval = cval \quad (25)$$

Such corresponding simplifying substitutions may be advantageously made in programming language embodiments, reducing the computational complexity and potentially reducing the introduction of numerical error.

Applying these simplifications to the three statements of the exemplary post-scan computation $$RR = rrval - 2 * \frac{rval}{tval} * rval + \left(\frac{rval}{tval}\right)^2 * tval \quad (26)$$

$$RC = rcval - \frac{cval}{tval} * rval + \frac{rval}{tval} * cval + \frac{rval}{tval} * \frac{cval}{tval} * tval \quad (27)$$

$$CC = ccval - 2 * \frac{cval}{tval} * cval + \left(\frac{cval}{tval}\right)^2 * tval \quad (28)$$

yields the simplification to the post-scan calculation:

$$RR = rrval - \frac{rval^2}{tval} \quad (29)$$

$$RC = rcval - cval * \frac{rval}{tval} \quad (30)$$

$$CC = CCval - \frac{cval^2}{tval} \quad (31)$$

For the RR and CC terms, it may appear surprising that the cross-product term and a square-term would evaluate in such a way as to partially cancel out and subsequently results in the difference between two square terms. However, on occasion this phenomena shows up in classical mathematic analysis, so it should not be disconcerting to one skilled in the art. Specifically it is an inventive step of the present invention to structure the mathematics in such a way as to make this cancellation possible and leverage it in an advantageous computation. As a bonus, the RC term also enjoys a similar simplification.

Closed-Form Expression for the Rotation Angle

Using the above, a covariance matrix, planar moment of inertia (matrix) tensor, or related 2×2 quadratic form matrix can be obtained in a simple single scan without requiring storage of the image but rather the storage of only six running sums.

As mentioned in the Introduction, the eigenvectors of the covariance matrix, planar moment of inertia (matrix) tensor, or other quadratic-form matrix of the like can be interpreted as depicting a set of rotated orthogonal coordinates. The angle between these rotated coordinates and the original reference coordinates can be associated with a rotation angle of the oblong active region's shape. In one interpretation, one of the eigenvectors may be used to define the angle. In another interpretation, the two-dimensional eigenvectors of the 2×2 covariance matrix may be related to columns of a 2×2 rotation matrix. In either case, the angle of a selected eigenvector can be calculated by taking the ratio of the two components of the eigenvector and presenting this ration to an inverse tangent or inverse cotangent. This calculated angle can be related to the rotation angle of the oblong active region's shape. Further, the way the angle is calculated (what ratio to take of elements of what eigenvector, whether inverse tangent or inverse cotangent is used, etc.) can directly incorporate the imposed interpretation of the rotation angle of the oblong active region's shape.

However, as mentioned in the introduction, in general finding eigenvectors involves a complicated algorithm. The present invention overcomes this by providing a closed-form solution for the components of a selected eigenvector sufficient to determine the angle of rotation. A closed form solution can be calculated because the 2×2 eigenvector and eigenvalue problem involves the roots of a simple quadratic equation. The well-known quadratic formula provides a closed-form expression for the roots of a simple quadratic equation as long as the coefficient of the cross-product term is non-zero. For cases where the coefficient of the cross-product term is non-zero, then, the eigenvectors and eigenvalues can be found in closed form. For cases where the coefficient of the cross-product term is zero, it can be readily seen that this corresponds to zero values of the off-diagonal elements of the quadratic-form (covariance, planar moment of inertia, etc.) matrix which have a straightforward geometric interpretation. In this way the rotation angle can be directly calculated from the entries of the quadratic form matrix without an eigensystem (eigenvector and eigenvalue) algorithm.

Specifically the matrix $$\begin{bmatrix} a & b \\ c & d \end{bmatrix} \quad (32)$$

can be readily shown through simple use of the quadratic formula to have the eigenvalues of $$\frac{(a + d + \sqrt{a^2 + 4bc - 2ad + d^2})}{2} \quad (33)$$

$$\frac{(a + d - \sqrt{a^2 + 4bc - 2ad + d^2})}{2} \quad (34)$$

For cases where c is non-zero, these eigenvalues can be used to calculate a closed-form representation of the eigenvectors. The eigenvectors may be normalized in a variety of ways, for example as $$\left\{ \frac{(a - d + \sqrt{a^2 + 4bc - 2ad + d^2})}{2c}, 1 \right\} \quad (35)$$

$$\left\{ \frac{(a - d - \sqrt{a^2 + 4bc - 2ad + d^2})}{2c}, 1 \right\} \quad (36)$$

Or by multiplying the eigenvectors above through by a factor of 2c, as $$\{(a - d + \sqrt{a^2 + 4bc - 2ad + d^2}), 2c\} \quad (37)$$

$$\{(a - d - \sqrt{a^2 + 4bc - 2ad + d^2}), 2c\} \quad (38)$$

The former representation, to the extent it can be directly calculated (rather than from a conversion of the latter representation), is advantageous in that the first element of each eigenvector is the same as the ratio of the first and second elements of the eigenvector (since the denominator of the ratio is 1).

A covariance matrix form requires c=b, so the above more general eigenvectors simplify to $$\left\{ \frac{\left(a - d + \sqrt{a^2 + 4b^2 - 2ad + d^2}\right)}{2b}, 1 \right\} \quad (39)$$

$$\left\{ \frac{\left(a - d - \sqrt{a^2 + 4b^2 - 2ad + d^2}\right)}{2b}, 1 \right\} \quad (40)$$

As to the inclusion or disregard for normalization in various definitions of the covariance or inertia matrix, clearly multiplying through all terms a, b, d with a normalization factor would simply cancel out in the above eigenvector expressions. It is noted that the eigenvalues would be scaled, but they are not used for the angle calculations to follow. By using a definition without normalization, many extra computation steps that do not add value can be avoided, improving real-time performance and reducing the amount of stored code.

Further, as to the inclusion of minus signs on the two off-diagonal elements of the covariance or inertia matrix called for in some definitions, review of the above calculations show this to reverse the sign of the angle that would be associated with the eigenvector. The sense of angle direction definition is an engineering design choice in the calculations and may be readily compensated for or handled in other ways to produce the desired computed outcome. By using a definition without off-diagonal minus signs, extra computation steps that do not add value can be avoided, further improving real-time performance and reducing the amount of stored code.

(By way of comparison, a rotation matrix form requires c=-b, so here the more general eigenvectors simplify to $$\left\{ \frac{\left(d - a + \sqrt{a^2 - 4b^2 - 2ad + d^2}\right)}{2b}, 1 \right\} \quad (41)$$

$$\left\{ \frac{\left(d - a - \sqrt{a^2 - 4b^2 - 2ad + d^2}\right)}{2b}, 1 \right\} \quad (42)$$

The values of RR, RC, and CC can be substituted for a, b, and d respectively to obtain a first eigenvector of the covariance matrias $$\left\{ \frac{RR - CC + \sqrt{RR^2 + 4*CC^2 - 2*RR*CC + CC^2}}{2RC}, 1 \right\} \quad (43)$$

and a first eigenvector of the rotation matrix as $$\left\{ \frac{CC - RR + \sqrt{RR^2 + 4*CC^2 - 2*RR*CC + CC^2}}{2RC}, 1 \right\} \quad (44)$$

a slightly different result.)

The covariance (or, if applicable, rotation) matrix eigenvectors can be then operated upon by inverse tangent or inverse cotangent operations to obtain angles with various zero-angle orientations and positive-negative signs affiliated to clockwise and counter-clockwise angle directions. For example, to obtain a rotation angle ψ so that a zero-valued angle is associated with the oblong elongation oriented vertically and a positive angle value rotating clockwise, the following expression may be used where RC is non-zero:

$$\psi = \text{ArcCot}\left[ \frac{RR - CC + \sqrt{RR^2 + 4*CC^2 - 2*RR*CC + CC^2}}{2RC} \right] \quad (45)$$

When RC is zero, the above expression become numerically undefined but may be interpreted analytically as having a (positive or negative) infinite value. The inverse cotangent function maps infinite value arguments to a zero angle, so a conditional "If-Then-Else" expression can be used to provide smooth handling of the rotation calculation between rotational angle values within the range of positive or negative 90 degrees:

$$\text{If}\left[ b != 0, \psi = \text{ArcCot}\left[ \frac{RR - CC + \sqrt{RR^2 + 4*CC^2 - 2*RR*CC + CC^2}}{2RC} \right], \psi = 0 \right] \quad (46)$$

The conditional expression can be expanded further to handle cases where the rotation angle is effectively 90 degrees, for example:

$$\text{If}\left[ \begin{array}{l} b != 0, \psi = \text{ArcCot}\left[ \frac{RR - CC + \sqrt{RR^2 + 4*CC^2 - 2*RR*CC + CC^2}}{2RC} \right], \\ \text{If}[RR \geq CC, \psi = 0, \psi = \frac{\pi}{2}] \end{array} \right] \quad (47)$$

where the value of $r_0$ is greater than $c_0$, the value of $\psi$ will be set to $$\frac{\pi}{2}.$$

This can be coded, for example, as follows.

```
if(RC!=0)                    // if RC is not equal to zero
    angle=ArcCot((RR-CC+sqrt(RR^2+4*(RC^2)-2*RR*CC+(CC^2)/(2*RC));
else if (RR>=CC)             // if RC is equal to zero and if RR>=CC
angle=0;                     // then the angle is zero
else
angle=PI/2;                  // otherwise the angle is PI/2
```

In general, to handle and distinguish the positive 90 degree rotation angle and negative 90 degree rotation angle additional information is needed. Such additional information may include, for example, information from pattern recognition functions, state information from angle-variation tracking, etc.

When used with low-power and/or otherwise busy processors (for example in small hand-held devices such as cellphones, PDAs, game controllers, remote controls, etc.), as well as with restricted word-size arithmetic (for example 8-bit), it can be advantageous to replace an actual inverse tangent or inverse cotangent function with a pre-computed table-look-up function as is understood by one skilled in the art.

As indicated above, this approach can be used to provide other derived parametric data such as measures of the oblongness of the oblong-shape via closed-form calculations of the eigenvalues. If the ratio of the eigenvalues is 1, the shape is a (non-oblong) circle. The farther the ratio of the eigenvalues is from the value of 1, the more oblong the shape.

As the eigenvectors for the covariance matrix (with c=b) are $$\frac{\left(a + d - \sqrt{a^2 + 4b^2 - 2ad + d^2}\right)}{2} \quad (48)$$

$$\frac{\left(a + d - \sqrt{a^2 + 4c^2 - 2ad + d^2}\right)}{2} \quad (49)$$

an exemplary closed-form expression for a (ratio of the eigenvalues) measure of oblongness of the shape is:

$$\text{oblongness} = \frac{a + d + \sqrt{a^2 + 4b^2 - 2ad + d^2}}{a + d - \sqrt{a^2 + 4b^2 - 2ad + d^2}} \quad (50)$$

The variables a, b, and d can be replaced with RR, RC, and CC as before to include as part of the post-scan algorithm described earlier.

Note that as this oblongness measure is a ratio of the eigenvalues, any scaling applied equally to both of the eigenvalues will cancel out. As a result, like the angle calculation, this oblongness measure is not affected by whether normalization is used or not in the definition of the covariance matrix.

Similarly, as the oblongness measure depends on the square of the B (b=RC) term, any off-diagonal minus signs which may or may not be used in the definition of the covariance matrix have no effect.

(By way of comparison, the eigenvectors for the rotation matrix (with c=−b) are $$\frac{a + d + \sqrt{a^2 + 4b^2 - 2ad + d^2}}{2} \quad (51)$$

$$\frac{a + d - \sqrt{a^2 + 4b^2 - 2ad + d^2}}{2} \quad (52)$$

another exemplary closed-form expression for a (ratio of the eigenvalues) measure of oblongness of the shape is:

$$\text{oblongness} = \frac{a + d + \sqrt{a^2 - 4b^2 - 2ad + d^2}}{a + d - \sqrt{a^2 - 4b^2 - 2ad + d^2}} \quad (53)$$

a slightly different result.)

Figure 7:
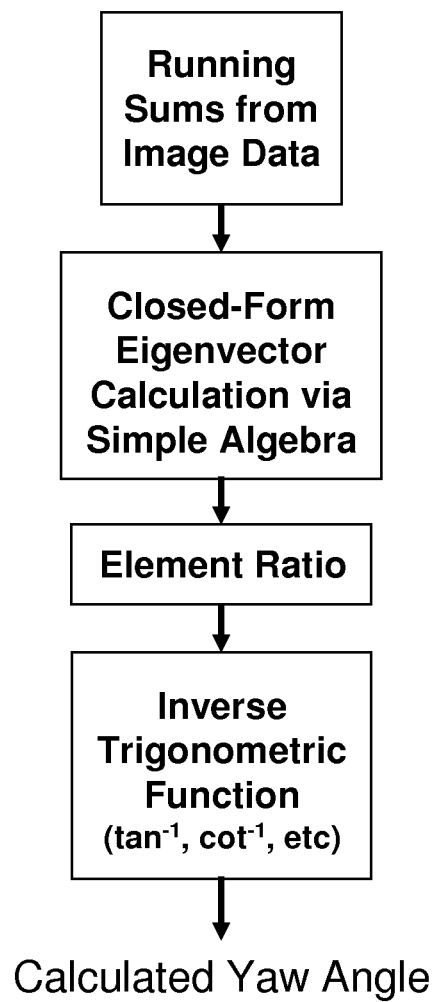
FIG. 7 depicts an exemplary representation of an embodiment of the invention.

A final result combining the various innovations of the invention results in a scalable high-performance closed-form single-scan calculation of oblong-shape rotation angles from binary images of arbitrary size using running sums. No eigenvector routines are used, and no storage of the image data is required. Only six running sums are calculated and stored throughout each scan, and the results are obtained in closed form by simple post-scan computation. This approach can be used to provide other derived parametric data as well, for example measures of the oblongness of the oblong-shape via closed-form calculations of the eigenvalues. An exemplary implementation is suggested in FIG. 7. An exemplary programming language embodiment is provided below:

```
for(ri=1; ri<=rows; ri++) {           // scan each row
    for(ci=1; ci<=cols; ci++) {       // scan each column
        if(p(ri,ci)>=t) {             // if the value of pixel exceeds the
                                      //   threshold
            tval++;                   // increment tval by 1
            rrval+=ri*ri;             // increment rrval by ri^2
            rval+=ri;                 // increment rval by ri
```

```
            ccval+=ci*ci;          // increment ccval by ci^2
            cval+=ci;              // increment cval by ci
            rcval+=ri*ci;          // increment rcval by ri*ci
        };
    };                             // end the scanning loop
                                   // begin post-scan calculations
            Rcenter = rval/tval;   //row center result for output
            Ccenter = cval/tval;   //column center result for output
RR=rrval − (rval^2)/tval;
            RC=rcval − (cval*rval/tval);
            CC=ccval − (cval^2)/tval;
if(RC!=0)                          // if RC is not equal to zero
    angle=ArcCot((RR−CC+sqrt(RR^2+4*(RC^2)−2*RR*CC+(CC^2)/(2*RC));
else if (RR>=CC)                   // if RC is equal to zero and if RR>=CC
angle=0;                           // then the angle is zero
else
angle=PI/2;                        // otherwise the angle is PI/2
                                   // angle result for output
Oblongness = ( (RR+CC+sqrt(RR^2+4*(RC^2)−2*RR*CC+(CC^2) ) /
   ( (RR+CC−sqrt(RR^2+4*(RC^2)−2*RR*CC+(CC^2) );
                                   // oblongness result for output
```

The computational efficiency may be improved further by a single reusable computation of some expressions such as:

$$\mathrm{sqrt}(RR^2+4*(RC^2)-2*RR*CC+(CC^2))$$

and, in some implementations, replacing the ArcCot function with simply-evaluated piecewise approximations and/or a table lookup of pre-computed values.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

I claim:

1. A method for computing a yaw angle of an oblong shape using a processor, the oblong shape being comprised of binary-valued image data formed of an array of active pixels, wherein each active pixel is a scalar measurement comprising a binary-valued numerical value, the method comprising:
   determining a cumulative sum of the square of row indices of active pixels, wherein an active pixel is defined as a measurement data element within the binary-valued image data having a specified binary numerical value;
   determining a cumulative sum of the square of column indices of active pixels;
   determining a cumulative sum of the product of row and column indices of active pixels;
   determining a value according to a closed form algebraic formula comprising the cumulative sum of the square of row indices, the cumulative sum of the square of column indices, and the cumulative sum of the product of row and column indices; determining the computed yaw angle of the oblong shape of binary-valued image data according to the value using an inverse trigonometric function operation; and providing the computed yaw angle as an output for use by additional software.

2. The method of claim 1 wherein the additional software provides a user interface function.

3. The method of claim 2 wherein the computed yaw angle is used as a user interface quantity for controlling at least one aspect of a computer application.

4. The method of claim 1 wherein the binary-valued image data is produced from measurement data provided by a tactile sensor array.

5. The method of claim 4 wherein the tactile sensor array comprises a tactile proximity sensor.

6. The method of claim 4 wherein the tactile sensor array comprises a tactile pressure sensor.

7. The method of claim 4 wherein the binary-valued image data is produced at least in part responsive to contact of a human hand with the tactile sensor array.

8. The method of claim 4 wherein the binary-valued image data is produced by comparing scalar measurement data to a selected numerical value, and if the scalar measurement data is at least as large as the selected numerical value, assigning the specified binary numerical value to the associated pixel of the binary-valued image data.

9. The method of claim 1 wherein the inverse trigonometric function operation comprises an inverse cotangent function.

10. The method of claim 1 wherein the processor comprises an embedded controller.

11. A computer implemented data processing system comprising:
   a memory that stores binary-valued image data; and
   a processor in communication with the memory that:
      receives the binary-valued image data, the binary-valued image comprising an array of pixels having rows and columns wherein each row and column has a unique associated index value, and each pixel having has a unique row index value and column index value wherein each pixel further comprises a binary value defined as a scalar measurement, the binary-valued image data comprising a subset of pixels arranged to form an oblong shape within the image data;
      computes the geometric center of the oblong shape, the geometric center comprising a row center value and a column center value;
      defines a corresponding centered row index value by subtracting the row center value from the row index value for each row index value;
      defines a corresponding centered column index value by subtracting the column center value from the column index value for each column index value;
      defines an active pixel as a measurement data element within the binary-valued image data exceeding a specified value;
      computes a first cumulative sum of the square of centered row index values of active pixels, second cumulative sum of the square of centered column index values of active pixels, and a third cumulative sum of the product of centered row index values and centered column index values of active pixels;

computes one or more numerical quantities within a closed form algebraic formula for a ratio of two terms of an inertial matrix defined by the binary-valued image data using each of first, second, and third cumulative sums;

transforms the ratio into a calculated numerical angle value using an inverse trigonometric function operation;

and provides the calculated numerical angle value to additional software.

12. The system of claim 11 wherein the additional software provides a user interface function.

13. The system of claim 12 wherein the calculated numerical angle value is used as a user interface quantity for controlling at least one aspect of a computer application.

14. The system of claim 11 wherein the binary-valued image data is produced from measurement data provided by a tactile sensor array.

15. The system of claim 14 wherein the tactile sensor array comprises a tactile proximity sensor.

16. The system of claim 14 wherein the tactile sensor array comprises a tactile pressure sensor.

17. The system of claim 14 wherein the binary-valued image data is produced at least in part responsive to contact of a human hand with said tactile sensor array.

18. The system of claim 14 wherein the binary-valued image data is produced by comparing each scalar measurement to a selected numerical value, and if the scalar measurement is at least as large as the selected numerical value, assigning the specified binary numerical value to the associated pixel of the binary-valued image data.

19. The system of claim 11 wherein the inverse trigonometric function operation comprises an inverse cotangent function.

20. The system of claim 11 wherein the processor comprises an embedded controller.

* * * * *